(12) United States Patent
Chishima

(10) Patent No.: US 11,838,623 B2
(45) Date of Patent: Dec. 5, 2023

(54) ELECTRONIC DEVICE, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yuki Chishima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/961,210

(22) Filed: Oct. 6, 2022

(65) Prior Publication Data
US 2023/0028469 A1 Jan. 26, 2023

Related U.S. Application Data

(63) Continuation of application No. PCT/JP2021/011670, filed on Mar. 22, 2021.

(30) Foreign Application Priority Data

Apr. 10, 2020 (JP) .................................. 2020-071196

(51) Int. Cl.
| | | |
|---|---|---|
| *H04N 23/65* | (2023.01) | |
| *H02J 7/00* | (2006.01) | |
| *H04N 23/667* | (2023.01) | |
| *H04N 23/661* | (2023.01) | |
| *H04N 23/56* | (2023.01) | |

(52) U.S. Cl.
CPC ......... *H04N 23/651* (2023.01); *H02J 7/0048* (2020.01); *H02J 7/0068* (2013.01); *H04N 23/56* (2023.01); *H04N 23/662* (2023.01); *H04N 23/667* (2023.01)

(58) Field of Classification Search
CPC .... H04N 23/651; H04N 23/56; H04N 23/662; H04N 23/667; H04N 23/663; H02J 7/0048; H02J 7/0068; H02J 7/00; G03B 7/091; G03B 15/05; G03B 17/02; G06F 1/26
See application file for complete search history.

(56) References Cited

U.S. PATENT DOCUMENTS

| | | | | |
|---|---|---|---|---|
| 6,101,339 A * | 8/2000 | Miki | ........................ | G03B 7/26 396/301 |
| 2004/0190889 A1* | 9/2004 | Hagiuda | .................. | G03B 7/26 396/205 |
| 2005/0088569 A1* | 4/2005 | Fu | .......................... | H04N 23/65 348/E5.029 |

(Continued)

FOREIGN PATENT DOCUMENTS

| | | |
|---|---|---|
| JP | 2000-041340 A | 2/2000 |
| JP | 2009-151488 A | 7/2009 |

(Continued)

*Primary Examiner* — Timothy J Henn
(74) *Attorney, Agent, or Firm* — Cowan, Liebowitz & Latman, P.C.

(57) ABSTRACT

An electronic device comprises a determination unit configured to determine a target remaining-capacity of a battery provided in an accessory device connected to the electronic device, based on an operation mode of the electronic device; and a power supply unit configured to supply power to the accessory device based on the determined remaining-capacity.

5 Claims, 4 Drawing Sheets

(56) References Cited

U.S. PATENT DOCUMENTS

2015/0089248 A1\* 3/2015 Obie ..................... G06F 1/266
                                                          713/300

FOREIGN PATENT DOCUMENTS

| JP | 2009-528625 A | | 8/2009 |
|---|---|---|---|
| JP | 2011253052 A | \* | 12/2011 |
| JP | 2013-034172 A | | 2/2013 |
| JP | 2016-537749 A | | 12/2016 |

\* cited by examiner

ELECTRONIC DEVICE, CONTROL METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2021/011670, filed Mar. 22, 2021, which claims the benefit of Japanese Patent Application No. 2020-071196, filed Apr. 10, 2020, both of which are hereby incorporated by reference herein in their entirety.

BACKGROUND OF THE INVENTION

Field of the Invention

The present invention relates to an electronic device, a control method thereof, and a non-transitory computer-readable storage medium.

Background Art

Patent Document 1 describes a computer that supplies power to a USB device when the computer and the USB device are connected.

CITATION LIST

Patent Literature

PL1: Japanese Patent Laid-Open No. 2009-151488

When a system in which power is supplied from a first device to a second device as described in Patent Document 1 is envisioned, consideration needs to be given to what condition is met in order to supply power from the first device to the second device.

SUMMARY OF THE INVENTION

According to one aspect of the present invention, it is possible to control power supply from a first device to a second device based on the operation mode of the first device.

According to one aspect of the present invention, there is provided an electronic device comprising: a CPU; and a memory storing a program which, when executed by the CPU, causes the CPU to function as: a determination unit configured to determine a target remaining-capacity of a battery provided in an accessory device connected to the electronic device, based on an operation mode of the electronic device; and a control unit configured to control power supply from the electronic device to the accessory device based on the determined remaining-capacity such that power supply from the electronic device to the accessory device is performed if a remaining-capacity of the battery of the accessory device is lower than the determined remaining-capacity, and power supply from the electronic device to the accessory device is stopped if the remaining-capacity of the battery of the accessory device is higher than or equal to the determined remaining-capacity, wherein the battery provided in the accessory device is charged with the power supplied from the electronic device.

Further features of the present invention will become apparent from the following description of exemplary embodiments with reference to the attached drawings.

DESCRIPTION OF THE EMBODIMENTS

Hereinafter, embodiments of the present invention will be described with reference to the drawings. Note the present invention is not limited by the following embodiments.

First Embodiment

Figure 1:
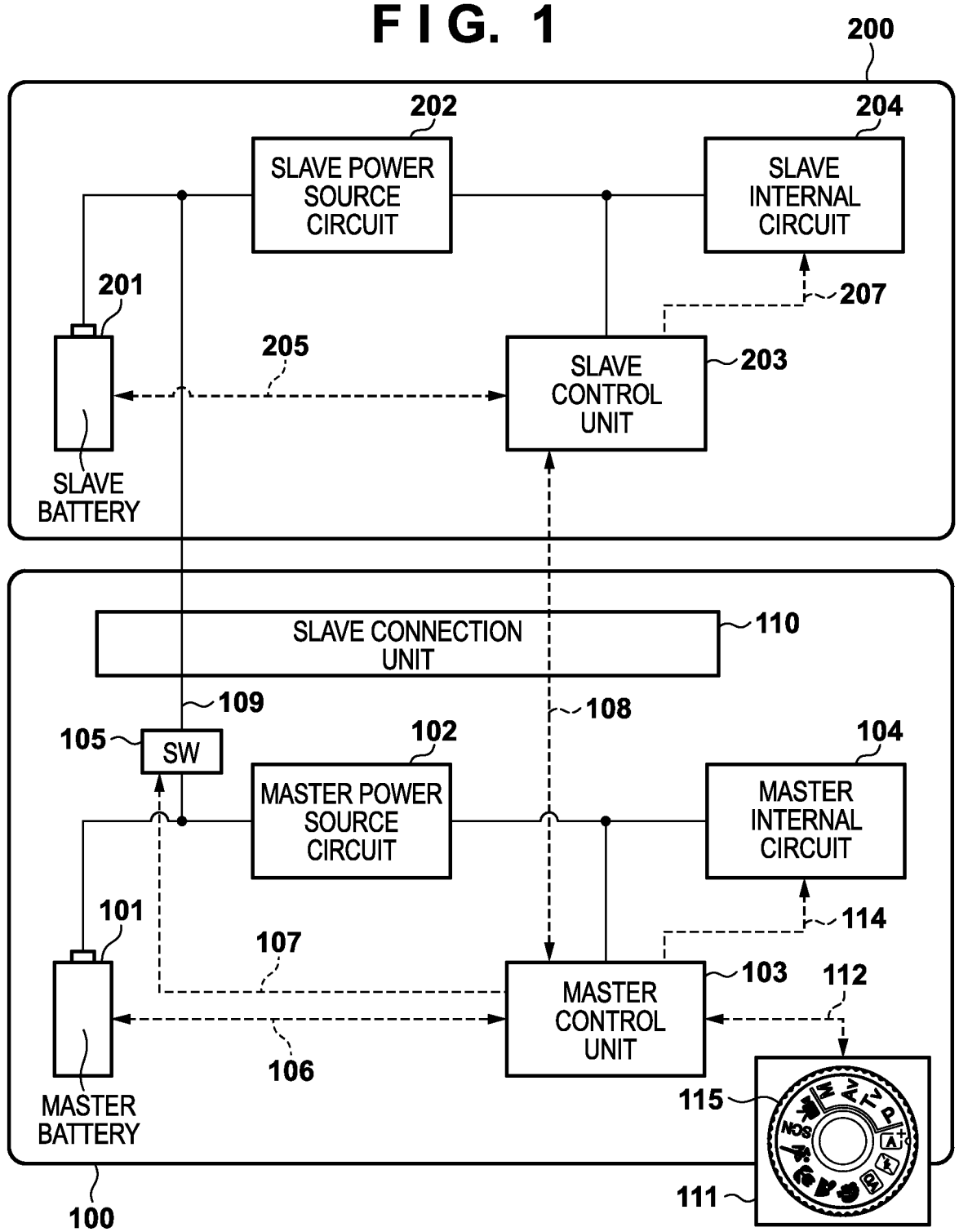
FIG. 1 is a block diagram for describing an example of constituent elements of a power supply system according to a first embodiment.

FIG. 1 is a block diagram for describing constituent elements of a power supply system according to a first embodiment. The power supply system in the first embodiment includes a master device 100 and a slave device 200. In the first embodiment, the master device 100 is an electronic device that can operate as a digital camera, for example. The slave device 200 is an electronic device that can operate as a stroboscope that is an accessory device of the master device 100. For ease of understanding, the master device 100 may be considered as an electronic device for controlling the slave device 200, and the slave device 200 may be considered as an electronic device that is controlled by the master device 100.

The master device 100 includes a master battery 101, a master power source circuit 102, a master control unit 103, a master internal circuit 104, a switch 105, a slave connection unit 110, and an operation unit 111.

The master battery 101 is a power source of the master device 100, and is a chargeable battery. The master battery 101 may also be a battery that is detachable from the master device 100.

The master power source circuit 102 converts the voltage of the master battery 101 into a voltage that is suitable for the master control unit 103 and the master internal circuit 104, and supplies the resultant voltage to the master control unit 103 and the master internal circuit 104. As a result, the master control unit 103 and the master internal circuit 104 function.

The master control unit 103 includes a processor, a memory (for example, an EEPROM) that stores a program to be executed by the processor, and a memory (for example, a RAM) that is used as a work area by the processor.

The operation unit 111 is a user interface on which the user can perform operations, and includes a switch, buttons, and a touch panel. The operation unit 111 also includes a mode dial 115 for setting a shooting mode.

Figure 2:
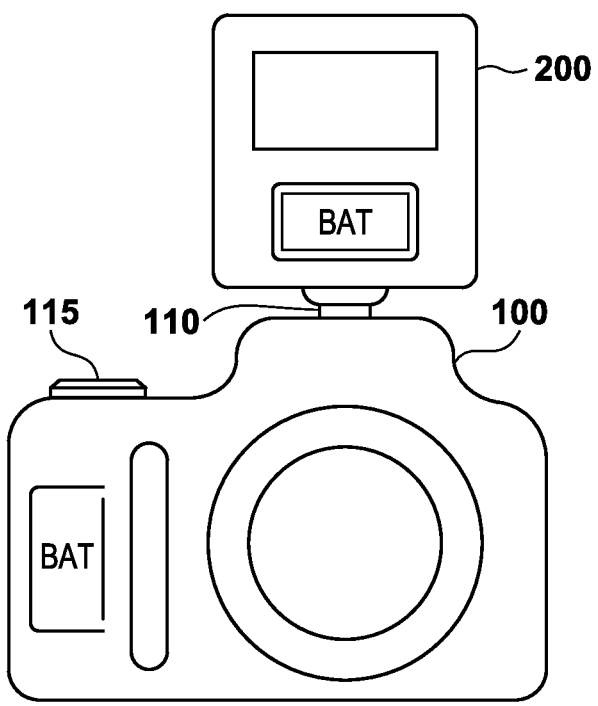
FIG. 2 is a diagram for describing an example of a connection state between a master device and a slave device.

The slave connection unit 110 electrically connects the master device 100 and the slave device 200, and integrally holds the master device 100 and the slave device 200. Since the master device 100 in the first embodiment is a digital camera, the slave connection unit 110 is an accessory shoe, for example. The master control unit 103 can detect connection of the slave device 200 to the slave connection unit 110. Detection methods include a method for using a mechanical switch that enters a pressed state when the slave device 200 is connected, a method for performing determination on connection using a voltage value of a specific signal line included in the slave connection unit 110, and the like, any of which may be adopted. FIG. 2 shows a state where the slave device 200 is connected to the slave connection unit 110 of the master device 100. One of the two "BATs" shown in FIG. 2 indicates the master battery 101, and the other indicates a slave battery 201.

The master control unit 103 can determine the remaining-capacity of the master battery 101 based on a signal received via a communication line 106. The master control unit 103 can also determine, based on a signal received via a communication line 112, whether or not an operation has been performed on the operation unit 111 by the user, and the type of the operation.

In addition, the master control unit 103 controls the master internal circuit 104 via a communication line 114. As a result, the master device 100 functions as a digital camera. Note that, in the first embodiment, the master internal circuit 104 is a circuit for providing functions of a digital camera, and a detailed description thereof is omitted.

When the slave device 200 is connected to the slave connection unit 110, the master control unit 103 can communicate with a slave control unit 203 of the slave device 200 via a communication line 108. In this communication, the master control unit 103 can transmit a plurality of types of requests to the slave connection unit 110. Requests that can be transmitted include a request for a remaining-capacity of a battery, a request for light emission, a request for model information, a request for performance information, a request for light emission history, and the like, but a detailed description thereof will be given later.

In addition, the master control unit 103 can control opening/closing of the switch 105 via a communication line 107. Therefore, when the slave device 200 is connected to the slave connection unit 110, and the switch 105 is open, power from the master battery 101 is supplied to the slave device 200. When the switch 105 is closed, power from the master device 100 is not supplied to the slave device 200.

The slave device 200 includes the slave battery 201, a slave power source circuit 202, a slave internal circuit 204, and the slave control unit 203.

The slave battery 201 is a power source of the slave device 200, and is a chargeable battery. The slave battery 201 may also be a battery that is detachable from the slave device 200.

Assume that the slave device 200 is connected to the slave connection unit 110 of the master device 100, and the switch 105 is open. In this case, power from the master battery 101 of the master device 100 is supplied to the slave battery 201 and the slave power source circuit 202 of the slave device. As a result, the slave device 200 operates using power supplied from the master device 100, and the slave battery 201 is charged.

The slave control unit 203 includes a processor, a memory (for example, an EEPROM) that stores a program to be executed by the processor, and a memory (for example, a RAM) that is used as a work area by the processor.

The slave control unit 203 can determine the remaining-capacity of the slave battery 201 based on a signal received via a communication line 205.

In addition, assume that the slave device 200 is connected to the slave connection unit 110 of the master device 100. In this case, the slave control unit 203 can communicate with the master control unit 103 of the master device 100 via the communication line 108. The slave control unit 203 then executes processing that is based on a request received via the communication line 108.

When, for example, a request for information regarding the remaining-capacity of the battery is received, the slave control unit 203 generates information regarding a percentage value indicating the remaining-capacity of the slave battery 201, based on a signal obtained via the communication line 205. The slave control unit 203 then transmits the generated information as a response to the request, to the master control unit 103 of the master device 100.

In addition, when a request for light emission is received, the slave control unit 203 controls the slave internal circuit 204 via a communication line 207 to perform strobe light emission. The slave control unit 203 then transmits information indicating that the light emission is complete, as a response to the request, to the master control unit 103. The slave control unit 203 also counts the number of times a request for light emission is received, and stores the counted value to a predetermined address in a volatile memory in association with the date of the requests, in a non-volatile memory. If the date when a request for strobe light emission is received differs from the date stored in the non-volatile memory, the slave control unit 203 resets the count value to "0" and then performs a count-up operation. As a result, the slave control unit 203 can store, in the non-volatile memory, the number of times of light emission in the latest day. Note that, in the first embodiment, the slave internal circuit 204 is a circuit that functions as a stroboscope, and a detailed description thereof is omitted.

Moreover, when a request for model information is received, the slave control unit 203 transmits information indicating the model name of the slave device 200 to the master control unit 103. When a request for performance information is received, the slave control unit 203 transmits information such as the guide number and the power consumption per strobe light emission, as a response to the request, to the master control unit 103. When a request for light emission history is received, the slave control unit 203 obtains, from the non-volatile memory, information indicating the number of times of light emission of stroboscope in the latest lay. The slave control unit 203 then transmits the obtained information indicating the number of times of light emission, as a response to the request, to the master control unit 103.

Figure 3:
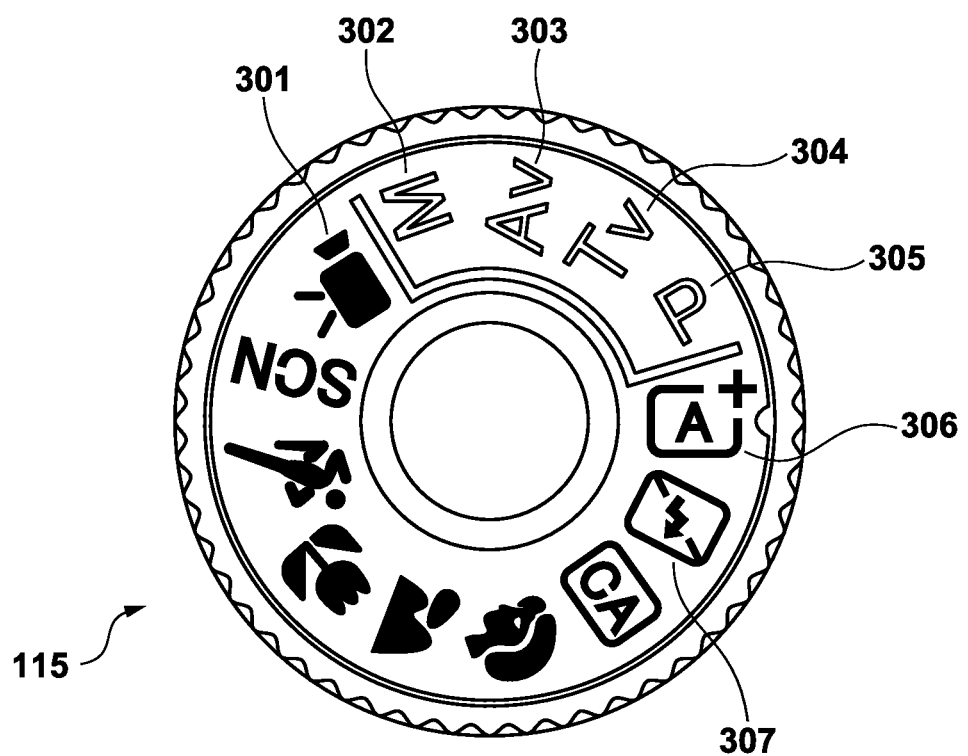
FIG. 3 is a top view of a mode dial for setting an operation mode of the master device.

FIG. 3 is a top view of the mode dial 115 that is a constituent element of the operation unit 111 of the master device 100. As shown in FIG. 3, symbols such as signs and characters respectively indicating a plurality of modes are engraved on the upper surface of the mode dial 115. The user can select a target mode by rotating this mode dial. The master control unit 103 can determine which mode the user has selected, based on a signal received via the communication line 112. Note that it suffices that one mode can be selected from a plurality of modes. Therefore, a configuration may also be realized in which a plurality of modes can be selected by providing menu display, instead of the mode dial.

A symbol 301 represents a mode for shooting and recording a moving image (hereinafter, a "moving image mode"). In the moving image mode, when the master control unit 103 receives a signal indicating that a predetermined button in the operation unit 111 is being pressed, via the communication line 112, the master control unit 103 executes processing for shooting and recording a moving image by controlling the master internal circuit 104.

Symbols 302 to 307 represent modes for shooting and recording a still image. The symbol 302 represents a shooting mode that is commonly called a "manual exposure shooting mode" (hereinafter, "M mode"). The symbol 303 represents a shooting mode that is commonly called an "aperture priority AE shooting mode" (hereinafter, "AV mode"). The symbol 304 represents a shooting mode that is commonly called a "shutter-speed priority AE shooting mode" (hereinafter, "TV mode"). The symbol 305 represents a shooting mode that is commonly called a "program AE shooting mode" (hereinafter, "P mode"). The symbol 306 represents a shooting mode that is commonly called an "auto exposure shooting mode" (hereinafter, "A mode"). The symbol 307 represents a strobe light emission inhibition mode. When the shooting mode is the strobe light emission inhibition mode, the master control unit 103 does not transmit a request for light emission to the slave device 200.

Moreover, in addition to the above common modes, modes that can be used by the master device 100 include modes in which a special shooting assistance is performed, such as a portrait mode and a macro mode, but, here, those modes are all defined as "other modes".

The inventor of the present application thought that the order of a mode in which strobe light emission performed by the slave device 200 is most likely to be used is roughly as follows.

$$\text{strobe light emission inhibition mode} \leq \text{moving image mode} < P \text{ mode} < M/AV/TV/A \text{ and other modes} \quad (1)$$

In the order expressed in Expression (1), the strobe light emission inhibition mode is the lowest since, even if there is no remaining-capacity of the slave battery 201, image capturing and recording are not affected. In addition, the moving image mode is the second lowest since a situation where a still image is shot and recorded using strobe light emission while a moving image is being shot and recorded is rare, although such a situation can occur. In the M/AV/TV/A modes, whether or not shooting that uses strobe light emission performed by the slave device 200 is performed depends on whether the shooting is performed outside or inside, a shooting situation such as climate, and preference of the user (the user setting). Note that strobe light emission is more likely to be performed in the M/AV/TV/A modes, than in shooting in the P mode.

Incidentally, the number of still images that are shot by the user is unknown, but in a shooting mode in which strobe light emission is more likely to be performed, a higher remaining-capacity of the slave battery 201 in the slave device 200 is obviously desired.

In view of this, when the slave device 200 is connected to the slave connection unit 110, the master control unit 103 determines a target remaining-capacity Wtarget of the slave battery 201 of the slave device 200. Note that a description will be given assuming that a remaining-capacity of a battery according to the first embodiment is expressed as a percentage of the total power amount of the target battery.

In order to determine the target remaining-capacity Wtarget, the master control unit 103 according to the first embodiment executes processing under the following conditions.

(i) If the remaining-capacity of the master battery 101 is lower than a threshold Th_m, processing for determining the target remaining-capacity Wtarget is not performed in order to prioritize operations of the master device.

(ii) The following processing is executed under the condition that the remaining-capacity of the master battery 101 is higher than or equal to the threshold Th_m.

When the shooting mode is the strobe light emission inhibition mode,
the master control unit 103 determines a predetermined value W0 for the strobe light emission inhibition mode as the target remaining-capacity Wtarget.

When the shooting mode is the moving image mode,
the master control unit 103 determines a predetermined value W1 for the moving image mode as the target remaining-capacity Wtarget.

When the shooting mode is the P mode,
the master control unit 103 determines a predetermined value W2 for the P mode as the target remaining-capacity Wtarget.

When the shooting mode is one of the M, AV, TV, A, and "other" modes,
the master control unit 103 transmits a request for light emission history to the slave device 200, and thereby receives the number of times N of strobe light emission during the latest day. The master control unit 103 then calculates the power consumption due to strobe light emission in shooting during the latest day, by multiplying the power consumption per strobe light emission, the number of times N of strobe light emission, and a correction coefficient. The master control unit 103 then calculates a value We that is a power consumption percentage by dividing the calculated power consumption by the total power of the slave battery 201. The master control unit 103 then compares the calculated value We with a predetermined value W3, and determines the higher value of the two as the target remaining-capacity Wtarget.

In the first embodiment, W0, W1, W2, and W3 have the following relation, based on the relation in Expression (1) above.

$$0 < W0 \leq W1 < W2 < W3$$

Here, W0 is set larger than zero in order to secure power sufficient for the slave control unit 203 to perform communication processing even if the remaining-capacity of the slave battery 201 of the slave device 200 is zero.

In this manner, the master control unit 103 determines the target remaining-capacity Wtarget.

Next, the master control unit 103 starts power supply processing for charging the slave battery 201 of the slave device 200 using the target remaining-capacity Wtarget.

In the power supply processing, the master control unit 103 receives information indicating the current remaining-capacity Ws of the slave battery 201 via the communication line 108. The master control unit 103 then compares the remaining-capacity Ws with the target remaining-capacity Wtarget. The master control unit 103 then executes the following two processes, based on the result of comparing the remaining-capacity Ws with the target remaining-capacity Wtarget.

If Ws<Wtarget,
the master control unit 103 opens the switch 105. As a result, power of the master battery 101 is supplied for charging the slave battery 201 of the slave device 200.

If Ws≥Wtarget,
the master control unit 103 closes the switch 105. As a result, power of the master battery 101 is not supplied to the slave device 200.

The power supply processing is repeatedly executed in a predetermined cycle (for example, at an interval of 1 minute). In repeated execution of the power supply processing, when the remaining-capacity Wm of the master battery 101 is lower than or equal to the threshold Th_m, the master control unit 103 stops the power supply processing.

In this manner, in the power supply processing, if the remaining-capacity Ws of the slave battery of the slave device 200 is higher than or equal to the target remaining-capacity Wtarget that depends on the set shooting mode, power is not supplied from the master device 100 to the slave device 200. In addition, if the remaining-capacity of the master battery 101 falls below the threshold Th_m during power supply from the master device 100 to the slave device 200, power supply is stopped.

Figure 4:
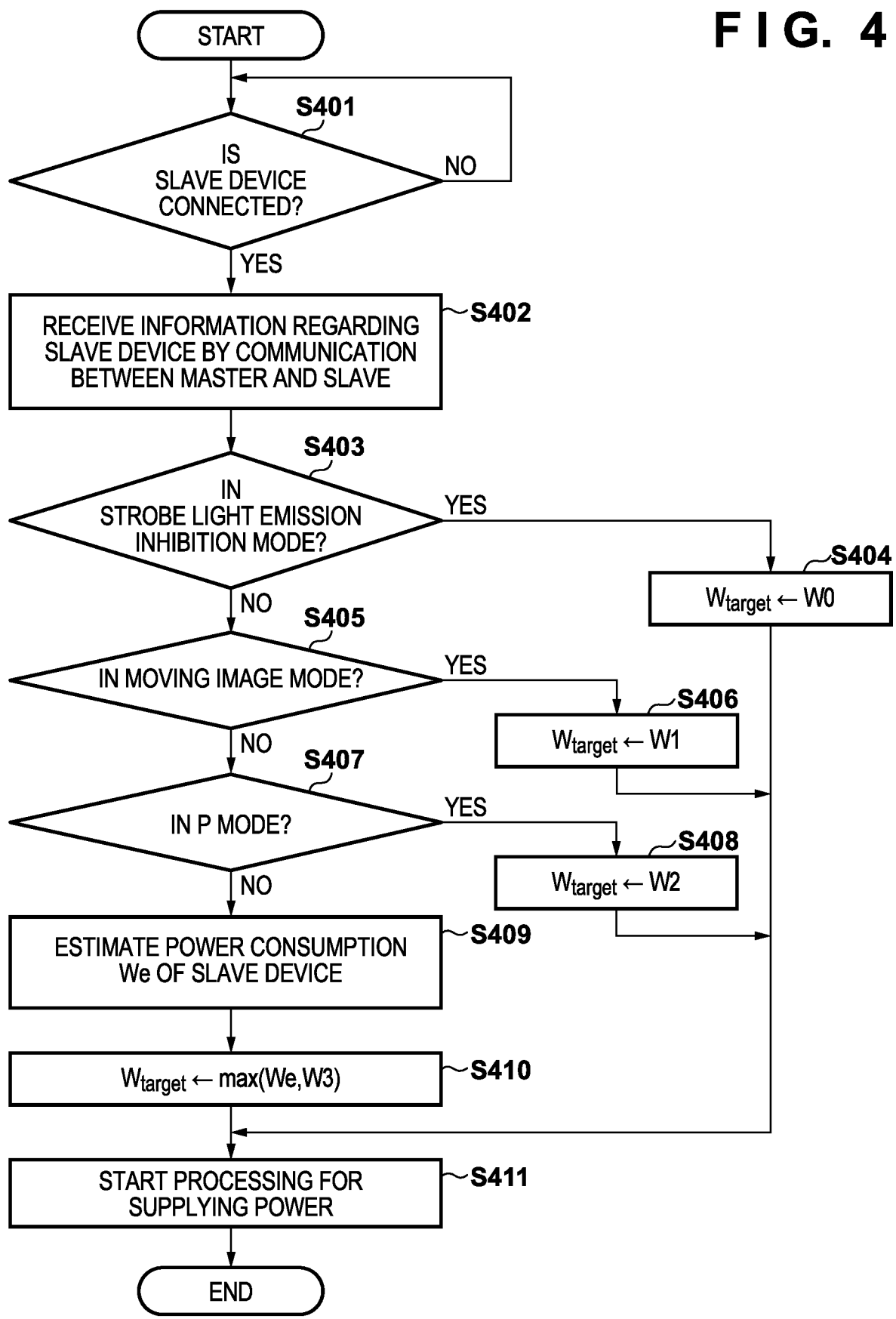
FIG. 4 is a flowchart for describing processing for determining a target remaining-capacity of a slave battery.

Next, processing for determining the target remaining-capacity Wtarget, that is performed by the master control unit 103 will be described with reference to the flowchart in FIG. 4.

In step S401, the master control unit 103 determines whether or not the slave device 200 is connected to the slave connection unit 110. When it is determined that the slave device 200 is connected to the slave connection unit 110, the master control unit 103 advances the procedure to step S402

In step S402, the master control unit 103 receives information regarding the slave device 200 from the slave device 200 via the communication line 108. The information regarding the slave device 200 includes the remaining-capacity of the slave battery 201, model information, performance information, and light emission history of the slave device 200. The master control unit 103 transmits a request for the remaining-capacity of the battery, a request for model information, a request for performance information, or a request for light emission history, and thereby can receive such information.

In step S403, the master control unit 103 determines whether or not the current shooting mode is the strobe light emission inhibition mode. If it is determined that the current shooting mode is the strobe light emission inhibition mode, the master control unit 103 advances the procedure to step S404. In addition, if it is determined that the current shooting mode is not the strobe light emission inhibition mode, the master control unit 103 advances the procedure to step S405.

In step S404, the master control unit 103 sets the value W0 as the target remaining-capacity Wtarget, and then advances the procedure to step S411.

In step S405, the master control unit 103 determines whether or not the current shooting mode is the moving image mode. If it is determined that the current shooting mode is the moving image mode, the master control unit 103 advances the procedure to step S406. In addition, if it is determined that the current shooting mode is not the moving image mode, the master control unit 103 advances the procedure to step S407.

In step S406, the master control unit 103 sets the value W1 as the target remaining-capacity Wtarget, and then advances the procedure to step S411.

In step S407, the master control unit 103 determines whether or not the current shooting mode is the P mode. If it is determined that the current shooting mode is the P mode, the master control unit 103 advances the procedure to step S408. In addition, if it is determined that the current shooting mode is not the P mode, the master control unit 103 advances the procedure to step S409.

In step S408, the master control unit 103 sets the value W2 as the target remaining-capacity Wtarget, and then advances the procedure to step S411.

The procedure advances to the processing of step S409 when the currently set shooting mode is one of the M, AV, TV, A, and "other" modes. In step S409, the master control unit 103 calculates the percentage value We indicating the power consumption due to strobe light emission in the latest day, based on the information regarding the slave device 200 received in step S402.

$$We = \alpha \times Wf \times N \times 100 / Wmax$$

Here, $\alpha$ is a correction coefficient, and is a real number larger than 1. This is because, even if strobe light emission is not performed, power that is consumed by a circuit such as the slave control unit 203 is taken into consideration. Also, Wf indicates power consumption per strobe light emission, and Wmax indicates the total power of the slave battery 201, which are included in the information regarding the slave device 200 received in step S402.

In step S410, the master control unit 103 sets the higher of the calculated value We and the predetermined value W3, as the target remaining-capacity Wtarget. "max ( . . . )" in step S410 in FIG. 4 is a function that returns the largest value among a plurality of numbers in the parentheses. The master control unit 103 then advances the procedure to step S411.

In step S411, the master control unit 103 starts processing for supplying power to the slave device 200.

The power supply processing that is started in step S411 will be described with reference to the flowchart in FIG. 5. It should be noted that this power supply processing is executed in a predetermined cycle as described above.

In step S501, the master control unit 103 obtains information indicating the remaining-capacity Wm of the master battery 101 via the communication line 106, and the procedure advances to step S502.

In step S502, the master control unit 103 compares the remaining-capacity Wm with the threshold Th_m. The master control unit 103 determines whether or not the remaining-capacity Wm is higher than the threshold Th_m, based on the result of comparing the remaining-capacity Wm with the threshold Th_m. If it is determined that the remaining-capacity Wm is higher than the threshold Th_m, the master control unit 103 advances the procedure to step S503. If it is determined that the remaining-capacity Wm is lower than or equal to the threshold Th_m, the master control unit 103 advances the procedure to step S506.

In step S503, the master control unit 103 transmits a request for the remaining-capacity of the battery to the slave control unit 203 via the communication line 108. The master control unit 103 then receives a response to the request, and thereby obtains the remaining-capacity Ws of the slave battery 201. The master control unit 103 then advances the procedure to step S504.

In step S504, the master control unit 103 compares the remaining-capacity Ws with the target remaining-capacity Wtarget. The master control unit 103 determines, based on the result of comparing the remaining-capacity Ws with the target remaining-capacity Wtarget, whether or not the remaining-capacity Ws is lower than the target remaining-capacity Wtarget. If it is determined that the remaining-capacity Ws is lower than the target remaining-capacity Wtarget, the master control unit 103 advances the procedure to step S505. If it is determined that the remaining-capacity Ws is higher than or equal to the target remaining-capacity Wtarget, the master control unit 103 advances the procedure to step S506.

In step S505, the master control unit 103 opens the switch 105 via the communication line 107. As a result, power is supplied to the slave device 200.

In step S506, the master control unit 103 closes the switch 105 via the communication line 107. As a result, power is not supplied to the slave device 200.

As described above, according to the first embodiment, the master control unit 103 of the master device determines the target remaining-capacity Wtarget of the slave battery 201 provided in the slave device 200, in accordance with the current operation mode of the master device (in the first embodiment, a shooting mode). If the remaining-capacity Ws of the slave battery 201 of the slave device 200 is lower than the target remaining-capacity Wtarget, the master control unit 103 continues power supply from the master device 100 to the slave device 200. Note that, when the remaining-capacity Wm of the master battery 101 falls below the threshold Th_m, power supply is stopped. As a result, it is possible to easily maintain a period during which the master device 100 and the slave device 200 continue a cooperative operation in an operation mode desired by the user.

Figure 5:
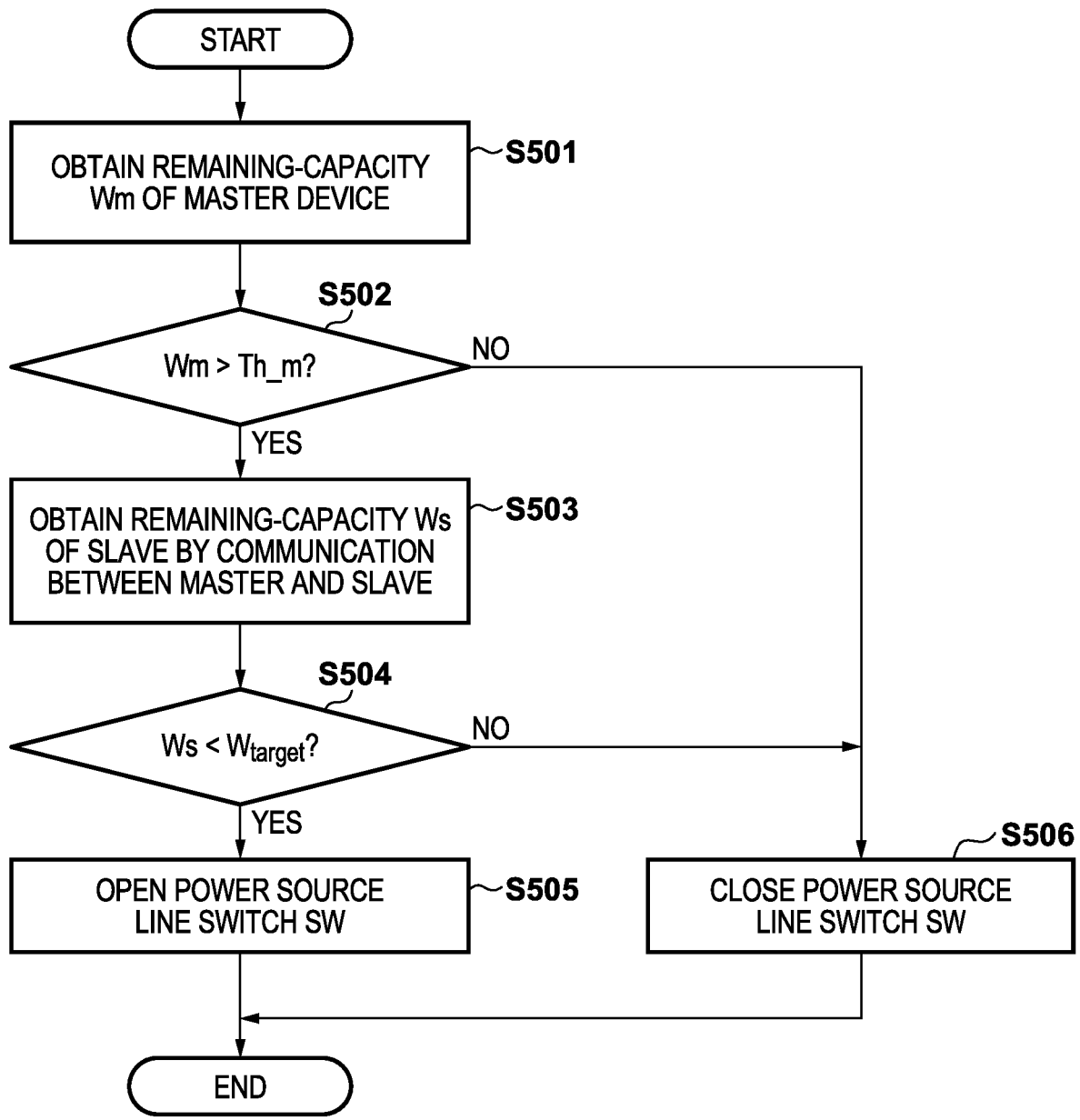
FIG. 5 is a flowchart for describing processing for supplying power to the slave device during state transition.

Note that there is the possibility that the user will change the operation mode while the power supply processing in FIG. 5 is performed. For this reason, the master control unit 103 first performs the determination in the flowchart in FIG. 5 as to whether or not the operation mode has been changed, and, if the operation mode has been changed, it suffices for processing for returning the procedure to the flowchart in FIG. 4 to be executed.

In addition, the values W0, W1, W2, and W3 described in the first embodiment may also be determined in accordance with the model of the slave device 200. For this reason, the ROM stores a table of the models of connectable slave devices and {W0, W1, W2, W3} associated with each other, in advance. The master control unit 103 then reads out corresponding {W0, W1, W2, W3} from the table based on information received from the slave device 200 connected to the master device 100, via the communication line 108, and executes the processing described in the first embodiment.

In addition, in the first embodiment, a description has been given in which the four values W0, W1, W2, and W3 are defined by classifying operation modes of the master device into four, but it suffices for the number of classification to be two or more, and the number of classification is not particularly limited.

In addition, in the first embodiment, an example has been described in which the master device 100 can operate as a digital camera, and the slave device 200 can operate as a strobe device, but the first embodiment is not limited to such an example. The first embodiment can be applied to any power supply system that includes the master device 100 that has a plurality of operation modes and the slave device 200 that can be connected to the master device.

OTHER EMBODIMENT

Various functions, various types of processing, or various methods described in the first embodiment can also be realized by a personal computer, a microcomputer, a CPU (Central Processing Unit), or a microprocessor executing programs. Hereinafter, in a second embodiment, a personal computer, a microcomputer, a CPU (Central Processing Unit), or a microprocessor are referred to as a "computer X". Also, in the second embodiment, a program for controlling the computer X and for realizing the various functions, various types of processing, or various methods described in the first embodiment is referred to as a "program Y".

The various functions, various types of processing, or various methods described in the first embodiment are realized by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage apparatus, a memory card, a volatile memory, a non-volatile memory, and the like. The computer-readable storage medium according to the second embodiment is a non-transitory storage medium.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic device comprising:
   a CPU; and
   a memory storing a program which, when executed by the CPU, causes the CPU to function as:
   a determination unit configured to determine a target remaining-capacity of a battery provided in an accessory device connected to the electronic device, based on an operation mode of the electronic device; and
   a control unit configured to control power supply from the electronic device to the accessory device based on the determined remaining-capacity such that power supply from the electronic device to the accessory device is performed if a remaining-capacity of the battery of the accessory device is lower than the determined remaining-capacity, and power supply from the electronic device to the accessory device is stopped if the remaining-capacity of the battery of the accessory device is higher than or equal to the determined remaining-capacity,
   wherein the battery provided in the accessory device is charged with the power supplied from the electronic device, wherein the electronic device is operable as a digital camera, and the accessory device is operable as a strobe device, wherein the operation modes of the electronic device includes a moving image shooting mode, a program AE shooting mode, and a strobe light emission inhibition mode, and wherein the determination unit determines the target remaining-capacity such that a first value is determined as the target remaining-capacity in the strobe light emission inhibition mode, a second value larger than the first value is determined as the target remaining-capacity in the moving image shooting mode, and a third value larger than the second value is determined as the target remaining-capacity in the program AE shooting mode.

2. The electronic device according to claim 1, wherein the control unit controls to supply power to the accessory device from a battery provided in the electronic device, and wherein, if a remaining-capacity of the battery provided in the electronic device is lower than or equal to a predetermined value, the control unit stops power supply to the accessory device.

3. The electronic device according to claim 1, further comprising:

a connector to which the accessory device is connected, wherein the control unit performs power supply to the accessory device via the connector.

4. A control method of an electronic device, comprising:

determining a target remaining-capacity of a battery provided in an accessory device connected to the electronic device, based on an operation mode of the electronic device; and controlling power supply from the electronic device to the accessory device based on the determined remaining-capacity such that power supply from the electronic device to the accessory device is performed if a remaining-capacity of the battery of the accessory device is lower than the determined remaining-capacity, and power supply from the electronic device to the accessory device is stopped if the remaining-capacity of the battery of the accessory device is higher than or equal to the determined remaining-capacity, wherein the battery provided in the accessory device is charged with the power supplied from the electronic device, wherein the electronic device is operable as a digital camera, and the accessory device is operable as a strobe device, wherein the operation modes of the electronic device includes a moving image shooting mode, a program AE shooting mode, and a strobe light emission inhibition mode, and wherein the determining determines the target remaining-capacity such that a first value is determined as the target remaining-capacity in the strobe light emission inhibition mode, a second value larger than the first value is determined as the target remaining-capacity in the moving image shooting mode, and a third value larger than the second value is determined as the target remaining-capacity in the program AE shooting mode.

5. A non-transitory computer readable storage medium storing a program for causing a computer of an electronic device to:

determine a target remaining-capacity of a battery provided in an accessory device connected to the electronic device, based on an operation mode of the electronic device; and controlling power supply from the electronic device to the accessory device based on the determined remaining-capacity such that power supply from the electronic device to the accessory device is performed if a remaining-capacity of the battery of the accessory device is lower than the determined remaining-capacity, and power supply from the electronic device to the accessory device is stopped if the remaining-capacity of the battery of the accessory device is higher than or equal to the determined remaining-capacity, wherein the battery provided in the accessory device is charged with the power supplied from the electronic device, wherein the electronic device is operable as a digital camera, and the accessory device is operable as a strobe device, wherein the operation modes of the electronic device includes a moving image shooting mode, a program AE shooting mode, and a strobe light emission inhibition mode, and wherein the electronic device is caused to determine the target remaining-capacity such that a first value is determined as the target remaining-capacity in the strobe light emission inhibition mode, a second value larger than the first value is determined as the target remaining-capacity in the moving image shooting mode and a third value larger than the second value is determined as the target remaining-capacity in the program AE shooting mode.

* * * * *